United States Patent

[11] 3,545,576

[72] Inventor Gerard Franz Josef Sahs
 Halsenbach, Germany
[21] Appl. No. 803,529
[22] Filed Feb. 27, 1969
[45] Patented Dec. 8, 1970
[73] Assignee Girling Limited
 Birmingham, England
 a British Company
[32] Priority Feb. 28, 1968
[33] Great Britain
[31] No. 9567/68

[54] MOUNTING FOR DISC BRAKES WITH SPRING BIAS
 6 Claims, 4 Drawing Figs.
[52] U.S. Cl. .................................................. 188/73.5
[51] Int. Cl. .................................................. F16d 65/02
[50] Field of Search .................................. 188/73, 73(CL), 205.3

[56] References Cited
UNITED STATES PATENTS
3,158,230  11/1964  Chouings ............... 188/73(CL)UX
3,166,158  1/1965   Burnett et al. .......... 188/73(A)UX
3,243,017  3/1966   Kleinstuck .............. 188/73
3,421,602  1/1969   Craske .................. 188/73(CL)UX Primary Examiner—George E. A. Halvosa
Attorney—Scrivener, Parker, Scrivener & Clarke ABSTRACT: A spot-type disk brake has a body member containing an opposed piston-type hydraulic actuator operative between a directly operated pad and a yoke which is adapted to support an indirectly operated pad and is slidably guided with clearance in grooves extending along opposite sides of the body member. A solid resilient member, such as a wire spring, biasses the yoke against the base of one of the grooves to prevent "klonk". The wire spring is attached to the yoke and one end rests resiliently against the body member.

PATENTED DEC 8 1970

MOUNTING FOR DISC BRAKES WITH SPRING BIAS

The present invention relates to a spot-type disk brake provided with a hydraulic actuator operative between a directly operated pad and a yoke adapted to support an indirectly operated pad, and slidably guided with clearance in grooves extending along opposite sides of a body member housing the actuator.

Due to the manufacturing clearance between the yoke and the grooves, the brake is susceptible to "klonk" when the brake is applied.

According to the present invention resilient means is provided for biasing the yoke against the base of one of the grooves.

The resilient means conveniently comprises a spring mounted on the yoke and resting against the body member. The spring can be a wire spring having one end hooked about the outside edge of the yoke, a central portion passing through an aperture in the yoke, and its other end resting against the body member.

The invention is further described, by way of example, with reference to the accompanying drawings, in which.

Figure 1:
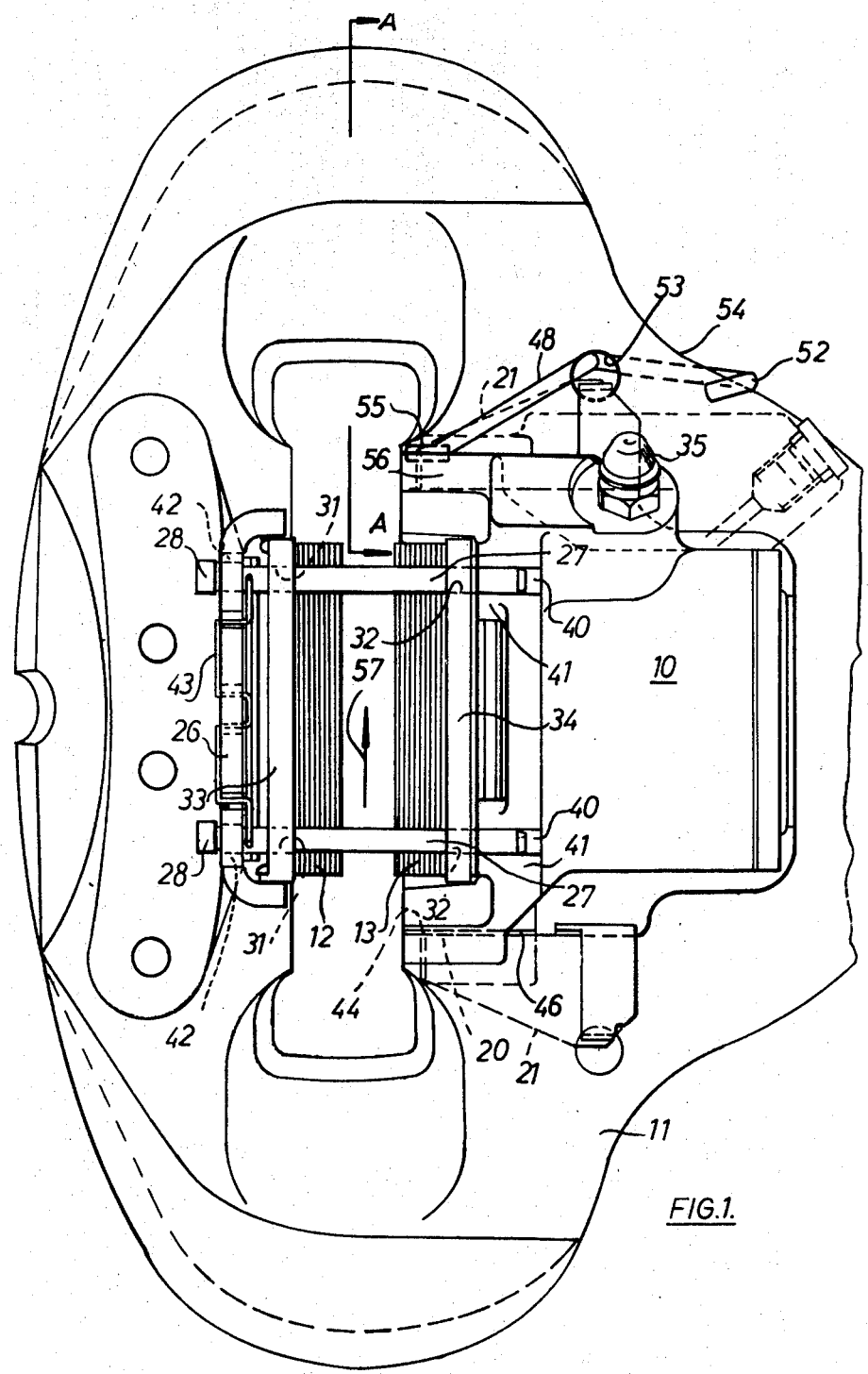
FIG. 1 is a plan view of a spot-type disk brake constructed in accordance with the invention.

Referring to FIG. 1 of the drawings, a spot-type disk brake for a mechanically propelled vehicle comprises a body member 10, a yoke 11 adapted to support an indirectly operated pad 12 and a hydraulic actuator formed within the body member 10 and operative between the yoke 11 and a directly operated pad 13. The hydraulic actuator comprises a pair of opposed pistons (not shown) slidable within a cylinder constituted by a through bore in the body member 10.

Figure 4:
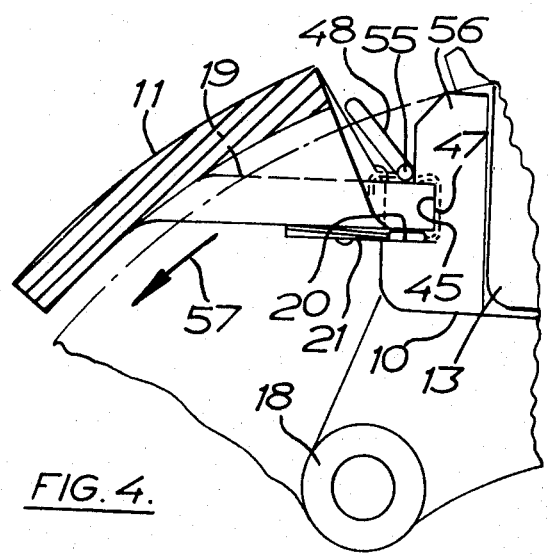
FIG. 4 is a fragmentary sectional view on the line A–A of FIG. 1.

The body member 10 has integral mounting lugs (of which the lug 18 is shown in FIG. 4) adapted to be bolted to a torque plate or other fixed part of the wheel mounting (not shown) adjacent a disk 19 FIG. 4 so that the disk periphery extends between the pads 12, 13. The body member 10 has a pair of longitudinal grooves 20 formed at opposite sides thereof, in which grooves the inside edges of the yoke 11 are guided with clearance. A spring 21 acts between one sidewall of each groove 20 and the yoke to urge the yoke against the other sidewalls of the grooves 20. One of the actuator pistons acts on the pad 13 whilst the other acts on the yoke 11 which is also located in said other piston by an inwardly extending tongue (not shown) formed integrally with the yoke and supported in a blind bore in said other piston.

An upstanding bracket 26, secured to the yoke 11 e.g. by rivets, adjacent the pad 12, has apertures 42 in which are supported one end of a pair of pad-retaining pins 27 whose other ends are slidably received in bores 40 through lugs 41 on the body member 10. The pins 27 have heads 28 to prevent the pins passing right through the bracket 26 during fitting of the brake pads. Back plates 33 and 34 respectively on the pads 12 and 13 have apertures 31 and 32 through which pass the pins 27 whereby the pads 12 and 13 are radially located in their appropriate positions. An inlet or bleeder opening 35, communicating with the hydraulic cylinder is provided at the top of the body member 10.

Figure 3:
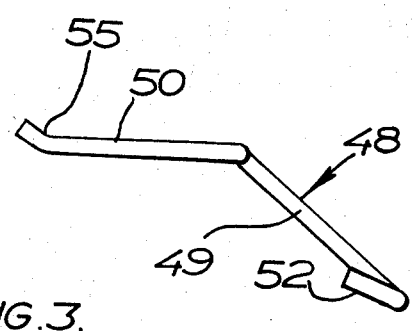
FIG. 3 is a plan view of the spring of FIG. 2.
Figure 2:
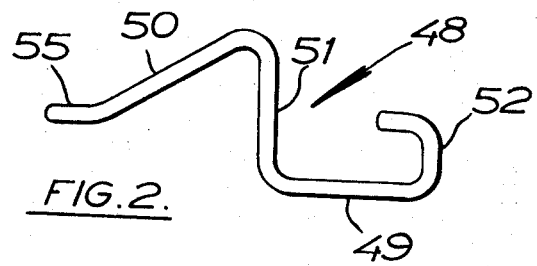
FIG. 2 is an enlarged elevation of a biasing spring acting between the yoke and the body member of the brake of FIG. 1.

A captive spring 43 prevents withdrawal of the pins 27 and is shown in detail in FIGS. 2 and 3.

The ends of the spring 43 releasably engage in holes in the pins 27 whilst its central portion embraces the bracket 26.

To permit manufacturing tolerances, clearance has to be provided between the inner longitudinal edges 44,45 of the yoke 11 and the bases 46,47 of the grooves 20 which receives these edges. A wire spring 48 biasses one longitudinal edge 44 of the yoke against the base 46 of the respective groove 20. The spring 48 is shown in detail in FIGS. 2 and 3 and comprises legs 49 and 50 joined by a central transverse portion 51.

One end of the spring is formed as a hook 52. As shown in FIG. 1, the central portion 51 passes through a hole 53 in the yoke 11 so that the legs 49 and 50 lie on opposite sides of the yoke 11. The hook 52 is hooked about the outer edge 54 of the yoke whilst the other end 55 of the spring 48 bears against one of the side arms 56 of the body member 10 as shown more clearly in FIG. 4.

The leg 49 with the hook 52 at its free end is at right angles to the transverse portion 51 and lies against the radially inner face of the yoke 11. The transverse portion 51 is considerably longer than the thickness of the yoke 11 and, to enable the end 55 to lie against the radially outer face of the yoke, the leg 50 is bent at an acute angle to the transverse portion 51. To enable the spring 48 to be adapted to the configuration of the yoke 11 the leg 49 is slightly cranked relative to the leg 50 as seen in plan (FIG. 3).

In an alternative embodiment (not illustrated), the length of the transverse portion 51 is the same as the thickness of the yoke and is perpendicular to both legs so that both legs 49 and 50 lie against the faces of the yoke. However the extra length of the illustrated transverse portion 51, which is stressed in torsion, is desirable to give the spring extra resilience.

The spring 48 is preferably so fitted in relation to the direction of rotation of the disk for forward motion of the vehicle, as indicated by the arrows 57 in FIGS. 1 and 4, that the brake reaction transmitted from the indirectly operated pad 12 to the body member 10 by the yoke 11, is transmitted between the longitudinal edge 44 of the yoke and the groove base 46 with which the edge 44 is normally held in engagement by the spring 48. The spring 48 thereby serves to prevent a "klonking" noise when the brake is applied. The "klonk" is not avoided when operating the brake for the reverse direction of motion but as reverse motion occurs comparatively infrequently, this is of no great disadvantage.

I claim:

1. In a spot-type disk brake a body member having longitudinal grooves along opposite sides thereof, each of said grooves having a base and opposed sidewalls; a yoke having inner longitudinal edges slidably received with substantial clearance in said longitudinal grooves; a wire spring mounted on said yoke and acting on said body member to bias one of said longitudinal edges of said yoke in a circumferential direction against the base of the respective one of said grooves; opposed directly and indirectly operated brake pads; and an actuator in said body member and operative between said directly operated pad and said yoke, said indirectly operated pad being acted upon by said yoke, said yoke having an aperture therein, said wire spring having first and second legs disposed at opposite sides of said yoke and a transverse portion passing through said aperture in said yoke and joining said legs together, said first leg having a free end with a hook thereon hooked about the outside edge of said yoke and said second leg having a free end bearing resiliently against said body member in a circumferential direction.

2. A disk brake according to claim 1 further comprising additional springs acting between one sidewall of each of said grooves and said yoke to urge said yoke against the other sidewalls of said grooves.

3. A disk brake according to claim 1 further comprising a bracket on said yoke, said bracket having apertures, said pads having apertures alined with said bracket apertures and said body member having holes alined with said pad and bracket apertures, pad retaining pins passing through said apertures in said bracket through said apertures in said brake pads and into said bores in said body member and a captive spring on said bracket releasably engaging said pins to prevent withdrawal thereof.

4. A disk brake according to claim 1 in which said actuator comprises a through-bore in said body member and a pair of opposed pistons slidable in said through-bore and acting respectively on said directly operated pad and upon said yoke.

5. A disk brake according to claim 1 in which one of said legs of said spring is at right angles to said transverse portion and lies against one face of the yoke, in which said transverse portion is substantially longer than the thickness of said yoke and in which the other of said legs of said spring is at an acute angle to said transverse portion so that said free end of said other leg lies adjacent said yoke.

6. A wire spring for a spot-type disk brake according to claim 5, which spring has first and second legs and a central transverse portion joining said legs together, said first leg lying in a plane at right angles to said central transverse portion and having a free end with a hook thereon and said second leg being at an acute angle to said transverse central portion and having a free end lying adjacent said plane.